United States Patent Office 3,066,618
Patented Dec. 4, 1962

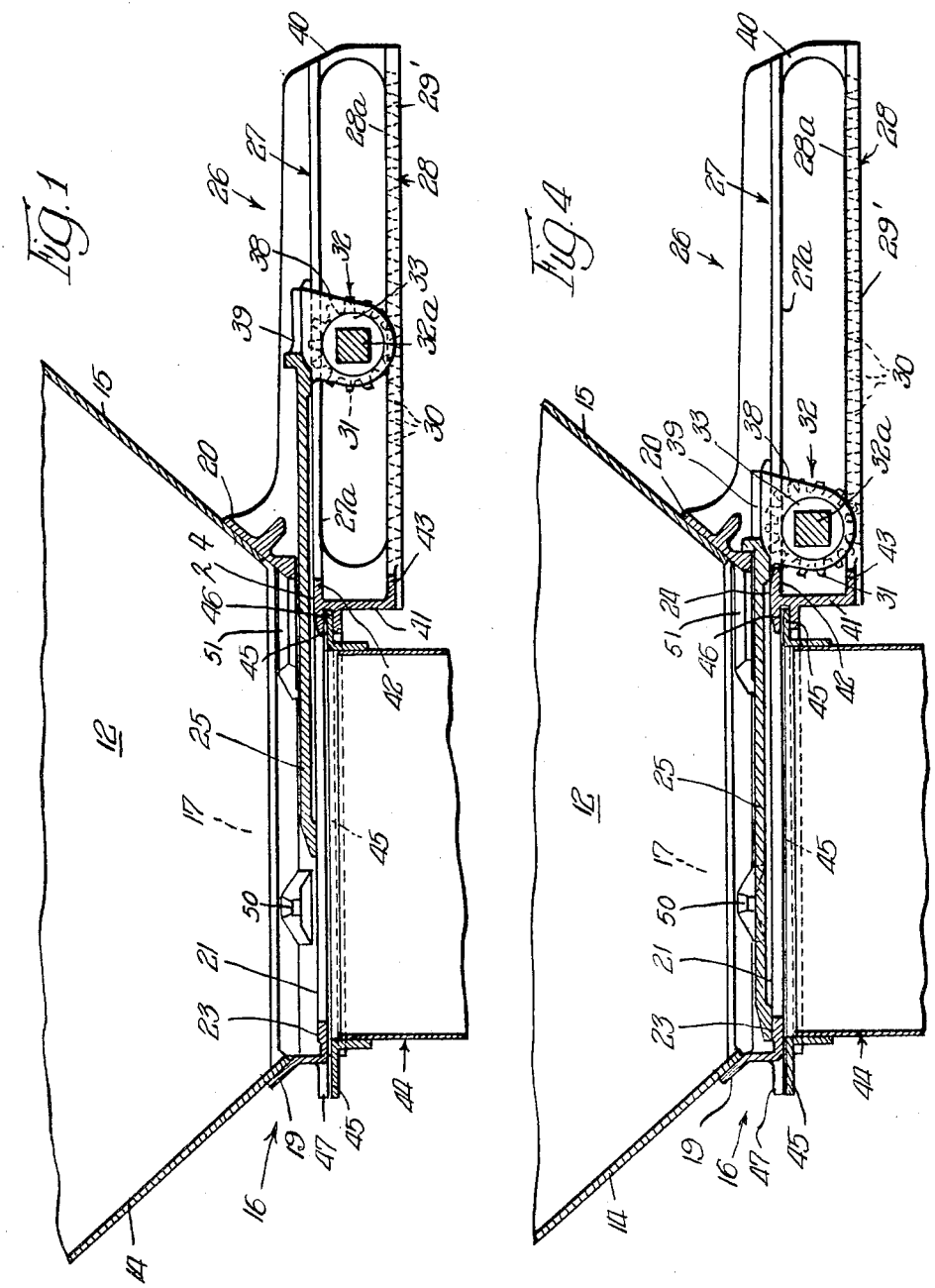
Dec. 4, 1962 — R. N. GUNNISON — 3,066,618
SLIDING CLOSURE OPERATING MECHANISM FOR HOPPER OUTLET
Filed Aug. 7, 1959 — 7 Sheets-Sheet 1
INVENTOR.
Richard N. Gunnison,
BY
Robert R. Lockwood
Atty.

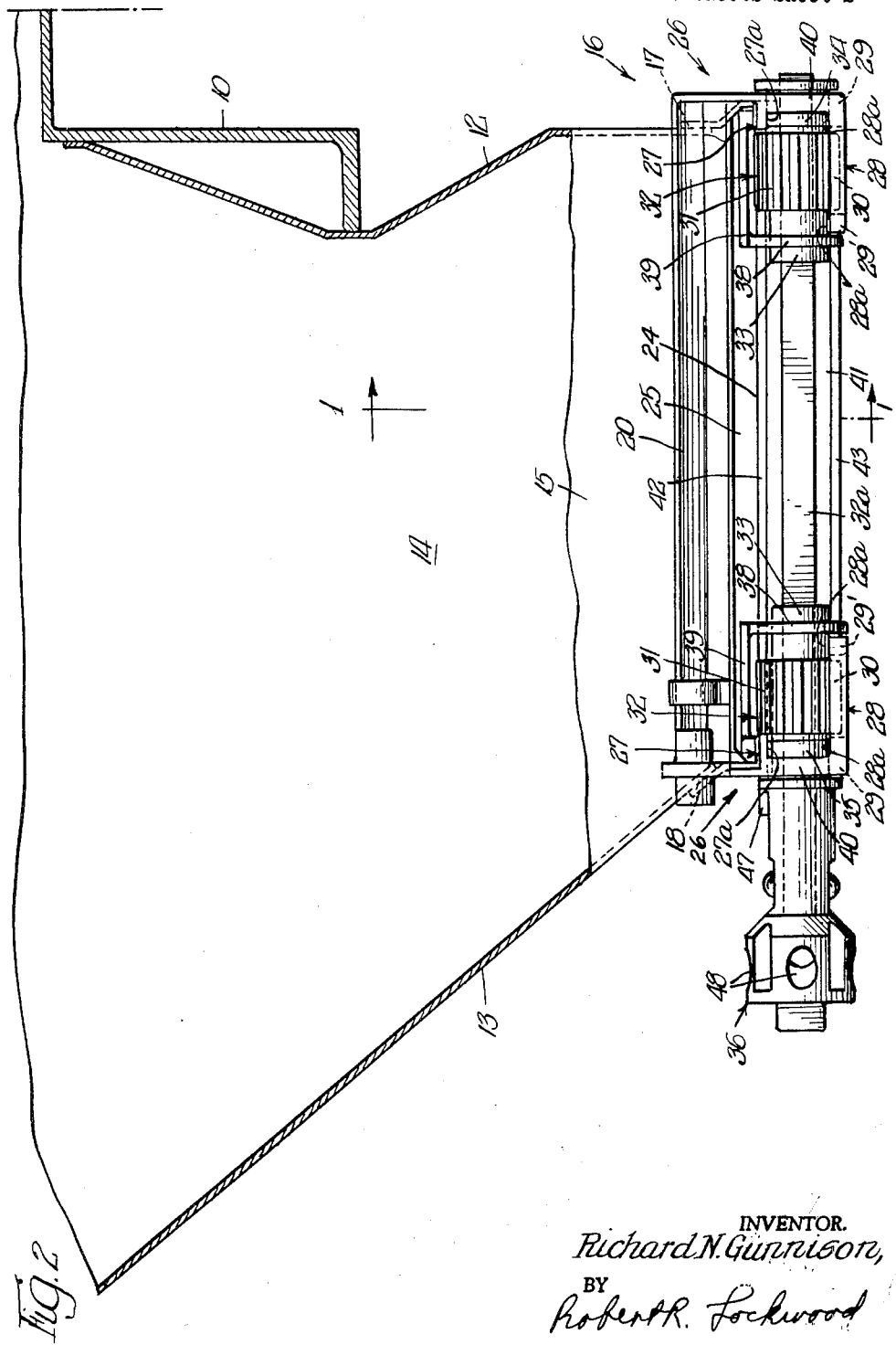

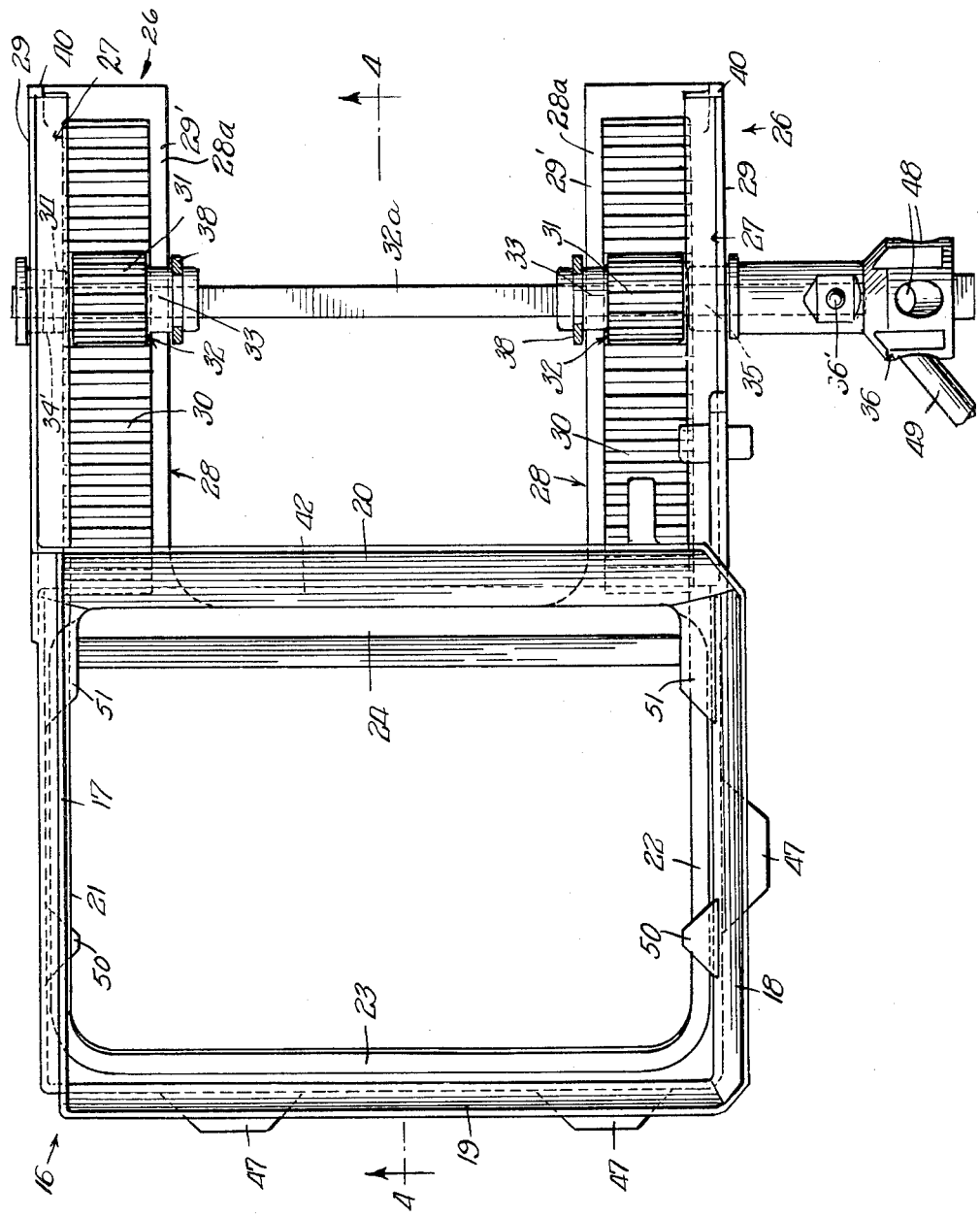

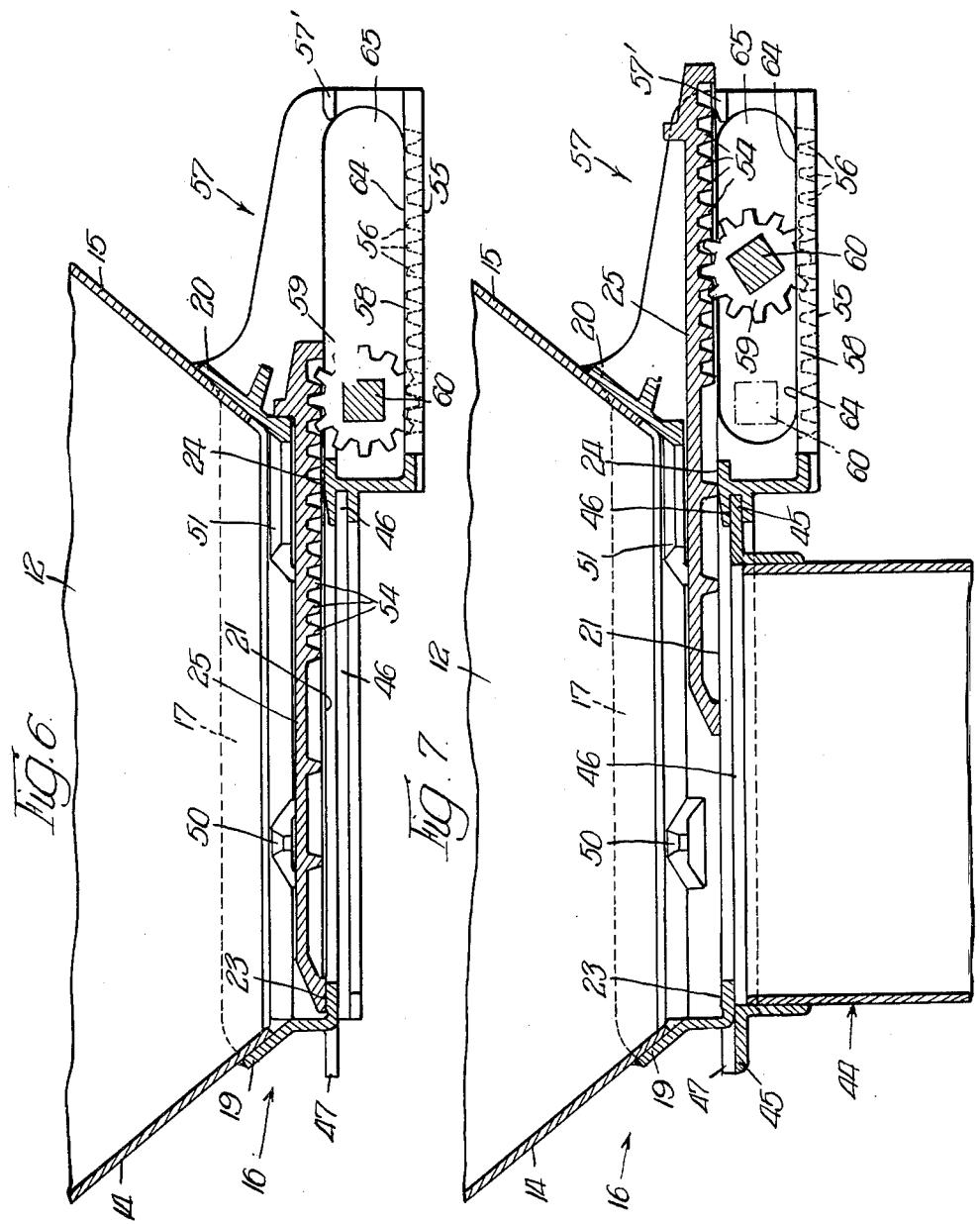

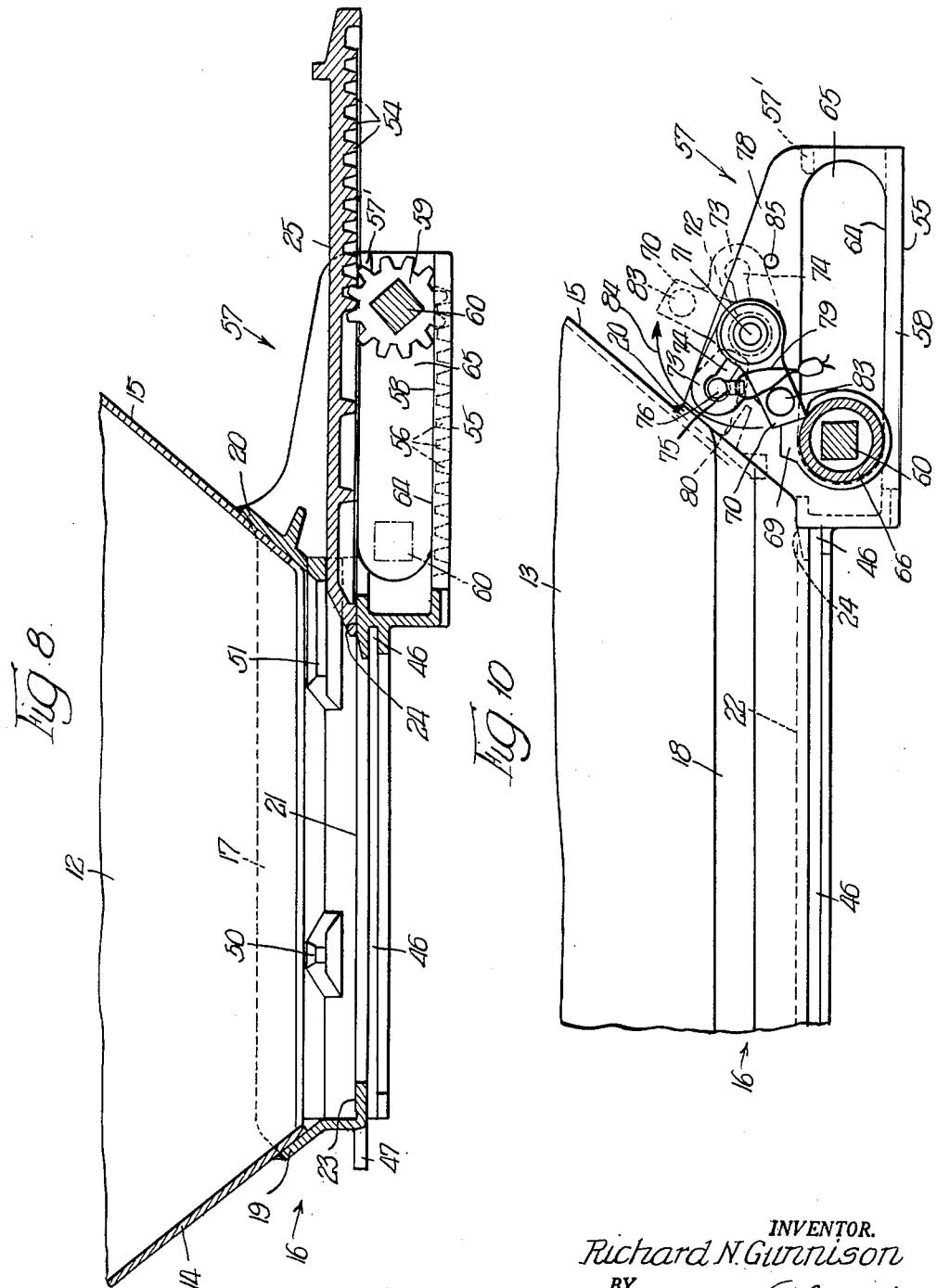

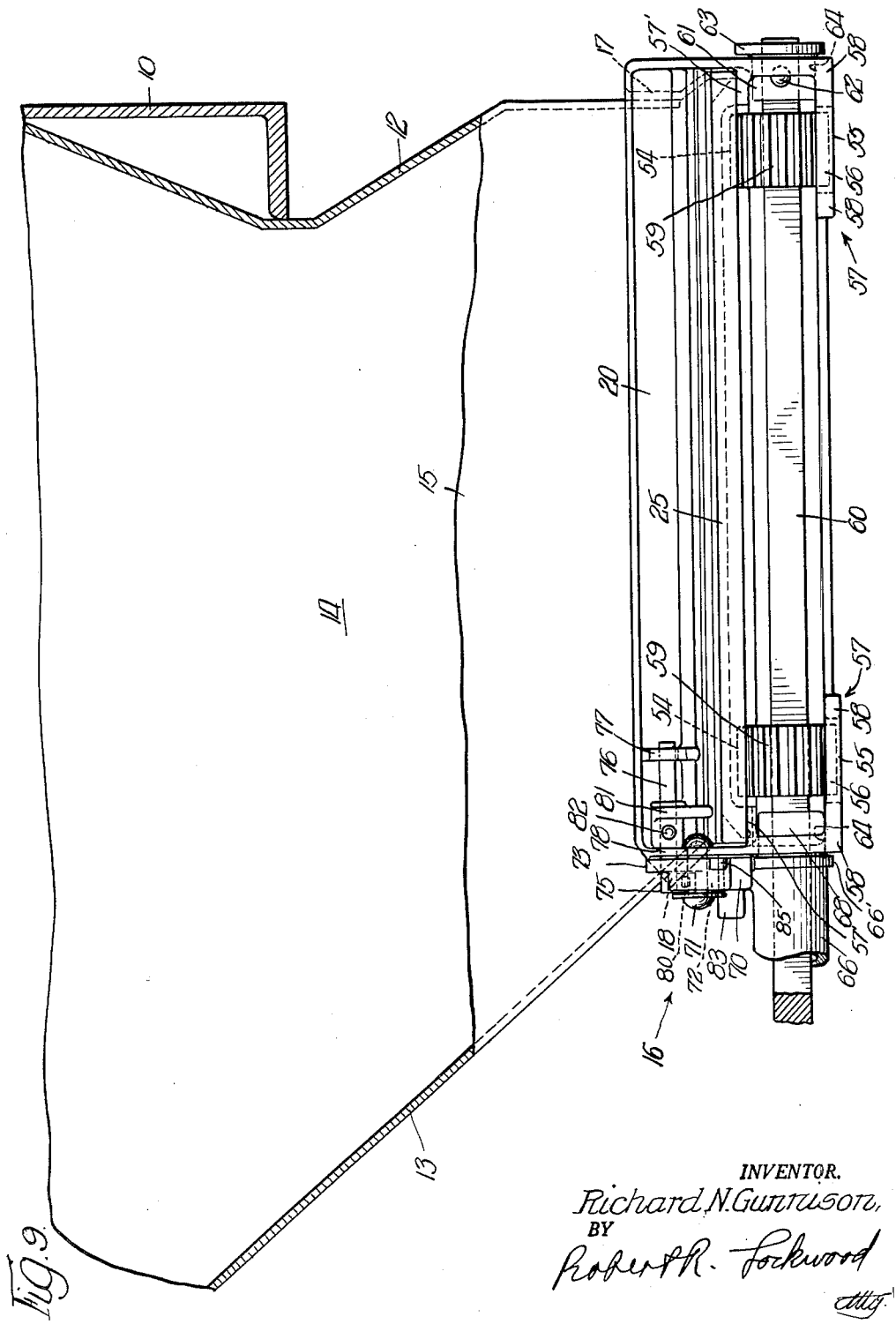

3,066,618
SLIDING CLOSURE OPERATING MECHANISM FOR HOPPER OUTLET
Richard N. Gunnison, Elmhurst, Ill., assignor to Enterprise Railway Equipment Company, Chicago, Ill., a corporation of Illinois
Filed Aug. 7, 1959, Ser. No. 832,270
4 Claims. (Cl. 105—282)

This invention relates to an improved discharge outlet assembly for a hopper of the type commonly employed for containing bulk material which may be discharged by gravity through an opening. This application is a continuation-in-part of application Serial No. 695,877, filed November 12, 1957, now abandoned.

The objects of the invention, among others, are: To provide an improved outlet assembly having a sliding gate for a discharge opening wherein the gate is moved by a rotatable shaft journaled in the gate and to provide a structure wherein the shaft is maintained against vertical displacement as pressure is exerted thereon; to provide ways which support the gate and also prevent upward movement of the gate and the operating shaft; to provide an outlet assembly having a sliding gate and a rotatable shaft journaled therein wherein the shaft is disposed at a location below the level of the gate; to provide separate ways for supporting a gate and shaft of an outlet assembly including a frame having an opening and a movable gate with a shaft journaled in the gate with pinion gears carried by the shaft to engage with racks for moving the gate by rotation of the shaft; to move the gate twice as far as the shaft carrying the pinion gears moves; and to mount the pinion gears for rotation with a shaft that is mounted for bodily translatory movement and for engagement with racks on the under side of the gate and stationary racks underneath the gate.

The invention further resides in the construction of the frame and in the arrangement of the ways for supporting the gate and shaft.

For further comprehension of the invention, reference may be had to the accompanying drawings wherein the invention is shown as applied to a railway hopper car.

In said drawings FIGURE 1 is a vertical sectional view of a portion of a railway car, taken generally along the line 1—1 of FIGURE 2, showing as much of the car as necessary to illustrate the application of the improved outlet assembly to the car, said view showing the gate in partly closed position.

FIGURE 2 is a vertical end view of the structure shown in FIGURE 1 as viewed from right to left, said view showing approximately one half the width of the lower portion of the car, portions of the hopper side walls and center sill being shown in section.

FIGURE 3 is a plan view of the structure shown in FIGURE 1 with the hopper floor sheets and sliding gate eliminated in order to show more clearly the details of construction of the outlet frame and the relation of the shaft and pinions thereto.

FIGURE 4 is a vertical longitudinal view taken through the hopper and as seen on a line 4—4 of FIGURE 3 with the gate shown in fully closed position.

FIGURE 6 is a vertical sectional view taken generally along the line 6—6 of FIGURE 5 and showing the gate in the fully closed position.

FIGURE 7 is a view, similar to FIGURE 6, but showing the gate in partly opened position and showing an extension chute mounted on the under side of the frame.

FIGURE 8 is a view, similar to FIGURE 6, but showing the gate in the fully opened position.

FIGURE 9 is a vertical sectional view of a portion of a railway car taken transversely thereof and showing an end view of the outlet frame construction illustrated in FIGURES 5, 6, 7 and 8 of the drawings with the gate in the closed and locked position.

FIGURE 10 is a fractional side elevational view of the outlet frame, the operating handle being shown in section and illustrating the locking mechanism that can be employed for holding the gate in the closed position.

Figure 5:
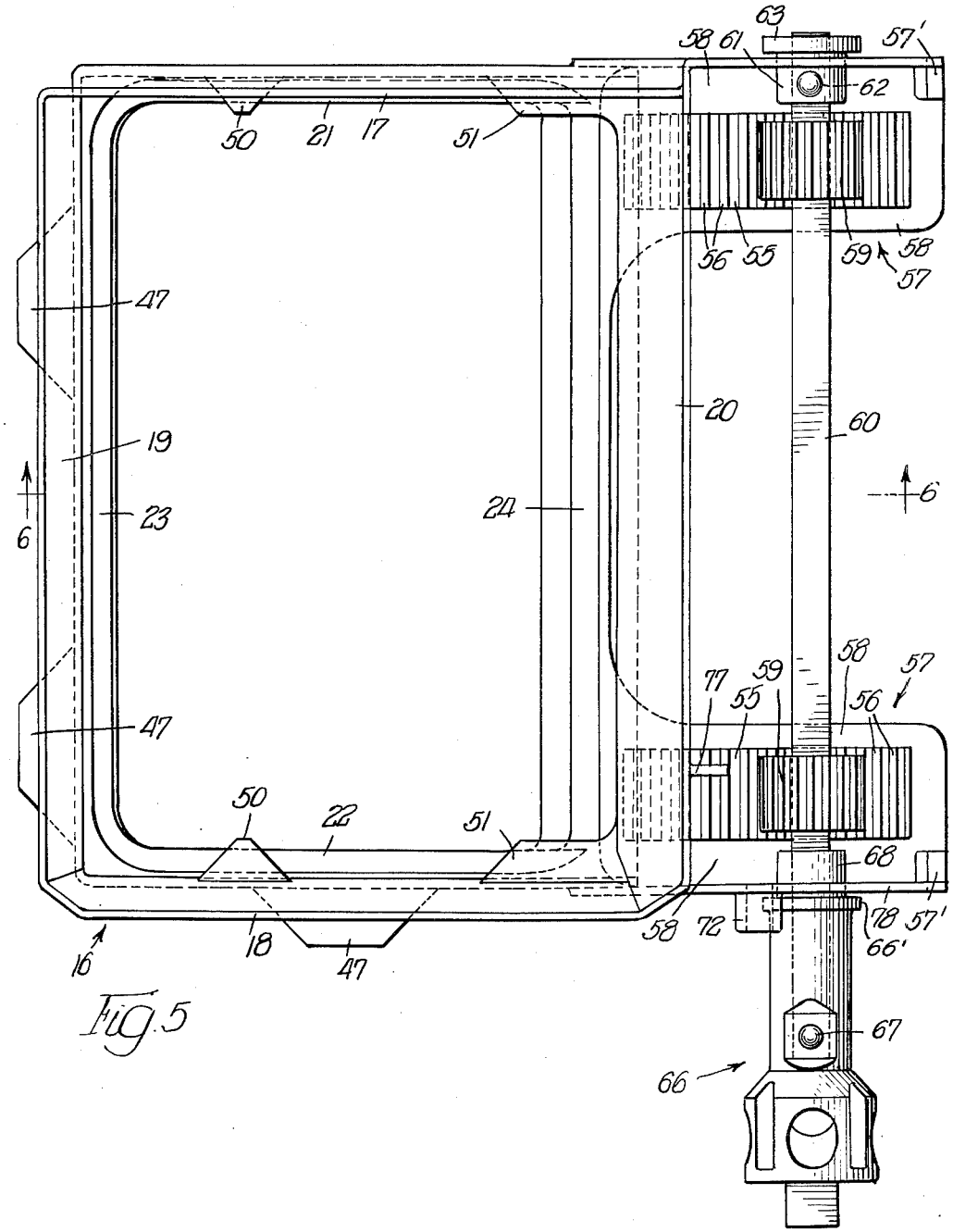
FIGURE 5 is a top plan view of an outlet frame construction showing a modified arrangement of the operating mechanism, the sliding gate being eliminated, the locking mechanism also being eliminated.

In said drawings the car framing includes a center sill 10 having spaced therefrom a side wall (not shown). Interposed therebetween is a four-sided load containing hopper including inner and outer side walls 12 and 13 which meet with oppositely sloping walls 14 and 15 to form the hopper.

The four walls 12, 13, 14 and 15 of the hopper have their lower marginal edge portions spaced from each other to define a discharge area which is borderd by a frame 16. The frame 16 includes an upper portion having walls 17, 18, 19 and 20 which overlie the four walls 12, 13, 14 and 15 of the hopper. The frame 16, below the upper portion, includes a lower section having longitudinal ways 21 and 22 and transversely connecting ways 23 and 24 on which a sliding gate 25 is supported. Intermediate the marginal edges of the longitudinal and transverse ways 21, 22, 23 and 24 there is an open space which constitutes the discharge opening proper and which is adapted to be closed by the gate 25.

Extending lengthwise of the frame 16 beyond the opening, there are extensions 26 which include upper and lower ways as indicated at 27 and 28, respectively. The upper ways 27 form uninterrupted continuations of ways 21 and 22 and form supports for the gate 25 throughout its movement between open and closed positions.

The lower ways 28, which are disposed at each side of the gate 25, include tracks 29 and 29' that are spaced apart to accommodate a series of rack teeth 30 therebetween. The rack teeth 30 interengage with teeth 31 of geared pinions 32 which are non-rotatably mounted on a rotatable shaft 32a, the latter, in turn, being journaled in the gate 25. The geared pinions 32 include hublike portions 33 on their inner ends which have rolling contact with the inner tracks 29'.

On the outer ends of the pinions 32 opposite to the hubs 33, a hublike effect is provided. At the outer end of the shaft 32a there is provided a collar 34 and adjacent the operating end of the shaft 32a the cylindrical end 35 of an operating head 36 provides the hublike formation. The collar 34 is secured to the outer end of the shaft 32a by a headless pin 34' and the operating head 36 is secured to the other end of the shaft 32a by a rivet 36'. The annular surfaces of the collar 34 and of the cylindrical end 35 of the operating head 36 are disposed immediately adjacent the undersurface 27a of the upper way 27. The shaft 32a is thus guided during its movement between the undersurface 27a of the upper way 27 and the upper surface 28a of the lower way 28. The gate 25 is provided with downwardly extending flanges 38 which are apertured to receive the hublike portions 33 of the pinions 32, thereby journaling the shaft 32a in the gate 25. The gate 25 is extended lengthwise above the pinions 32 as indicated at 39 and thereby acts as a shield to prevent the lodgment of such material in the teeth 30—31 as might hinder the proper meshing therebetween.

The upper and lower ways 27—28 are united at their outer ends by transversely extending walls 40 and adjacent the discharge opening there is a transversely extending wall 41 which is reinforced at its upper and lower margins by horizontally extending flanges 42 and 43. The walls 40 and flanges 42—43 have their upper surfaces disposed in alignment with the bearing surfaces of upper and lower ways 27 and 28.

The arrangement described above provides for an extension or structure 26 embodying the upper and lower ways 27—28 which extends appreciably below the opening defined by the hopper walls 12, 13, 14 and 15 and leaves an unobstructed space therebelow for accommodating a removable extension chute indicated at 44. The chute 44 includes an outstanding flange 45 which is adapted to interfit on two sides with a groove 46 in the frame 16 below the walls 17 and 20. To accommodate the other two sides of the flange 45, flanges 47 are provided which project outwardly from the walls 18 and 19. Suitable clamp means (not shown) are employed to secure the flange 45 of the chute 44 to the flanges 47.

The operating head 36 is of the conventional type with a socket receiving portion having openings 48 for receiving a removable bar or tool 49.

Lugs 50 and 51 are formed integrally with the frame walls 17 and 18 and overlie the gate 25 in closed position to keep it from bouncing during transit when no lading is present in the hopper.

FIGURES 5–10 of the drawings show another embodiment of the invention, the principal difference between the embodiment here shown and that illustrated in FIGURES 1–4 of the drawings residing in the manner in which the gate 25 is operated between the closed and open position. Insofar as possible where the same elements are employed in FIGURES 5–10 of the drawings, the same reference characters have been applied that are used in FIGURES 1–4 of the drawings. More particularly, in FIGURES 1–4 of the drawings the shaft 32a provided with the pinions 32 is journaled on the gate 25 and moves therewith as the pinions mesh with the rack teeth 30. This construction requires that the rack teeth 30 be provided for an extent equal to the opening movement of the gate 25. By applying the construction shown in FIGURES 5–10 of the drawings, it is possible to reduce the length of the stationary racks by one half.

Referring now particularly to FIGURES 5–9 of the drawings, it will be observed that rack teeth 54 are provided on the under side of the gate 25 along the opposite sides thereof adjacent the longitudinal ways 21 and 22. Below and parallel to the rack teeth 54 on the under side of the gate 25 are racks 55 which are provided with upwardly extending rack teeth 56. It will be observed that the racks 55 underlie the rack teeth 54 and that they are spaced outwardly away from the frame wall 20 while the rack teeth 54 on the under side of the gate 25, when it is in closed position as shown in FIGURE 6, are spaced about half way along the length of the gate 25 beginning at the frame wall 20. Further, it will be observed that the lengths of the racks 55 are equal to the length of the gate 25 along which the rack teeth 54 depend.

The racks 55 are mounted on extensions 57 which project from the frame walls 17 and 18 beyond the transverse frame wall 20. The extensions 57 correspond, generally, to the extensions 26, described hereinbefore, but need be only about one half as long in view of the provision of the rack teeth 54 on the under side of the gate 25 and along the sides thereof. At the ends of the rack teeth 56 flanges 58 extend upwardly for the purpose of guiding pinions 59 therealong. It will be observed that the pinions 59 mesh not only with the rack teeth 56 but also that they mesh with the rack teeth 54 depending from the under side of the gate 25. Two pinions 59 are provided, as shown in FIGURES 5 and 9 of the drawings, and they have central square openings therethrough for receiving a correspondingly shaped shaft 60. In this manner the pinions 59, while loosely mounted on the shaft 60 having a square cross section, still are non-rotatable with respect thereto. They are held against endwise movement by the flange 58 at the ends of the rack teeth 56.

It will be observed that the shaft 60 is mounted for rotation and translatory movement with respect to the gate 25. At its outer end the shaft 60 is provided with a collar 61 having a cylindrical outer surface. The collar 61 is held in place on the shaft 60 by a transverse rivet 62. A radially extending flange 63 on the collar 61 serves to guide it along the outer side of the respective extension 57. The outer periphery of the collar 61 rolls along a lower edge 64 of a slot 65 in the respective extension 57. At the other end of the shaft 60 there is an operating head 66, FIGURE 5, which is held in place thereon by a transverse rivet 67. The operating head 66 has a hub portion 68 which extends through the slot 65 in the adjacent extension 57 and rolls along the lower edge 64 thereof. A radial flange 66' on the operating head 66 guides it along the adjacent wall 78.

When the mechanism is assembled as described, on rotation of the shaft 60 in a clockwise direction with the gate 25 closed, as shown in FIGURE 6, the pinions 59 roll along the rack teeth 56 on the racks 55 and cause the shaft 60 to move tranlatorily therewith. Since the upper sides of the pinions 59 also mesh with the rack teeth 54 on the under side of the gate 25, the latter is moved translatorily through a distance which is equal to twice the distance that the shaft 60 is translatorily moved. Thus, when the shaft 60 is moved from the broken line position shown in FIGURE 7 to the position shown by full lines here or about half way along the slot 65, the gate 25 has been moved through approximately one half its range of movement toward the open position. The full open position is shown in FIGURE 8 where the shaft 60 has moved translatorily one half the distance that the gate 25 has moved.

While the gate 25 in the open position is supported intermediate its ends by the pinions 59, it may be desirable to support the right end of the gate 25 while it is moving past the intermediate position as shown in FIGURE 7. For this purpose lugs 57' are provided on and formed integrally with the extensions 57. Thus, as the gate 25 moves past the central position, as shown in FIGURE 7, the right end of the gate 25 along its opposite sides moves over the lugs 57' and is supported thereby.

It is desirable that means be provided for locking the gate 25 in the closed position. For this purpose, as shown in FIGURES 9 and 10 of the drawings, the operating head 66 is provided with a radially extending lug 69 that is arranged to be engaged by a locking arm 70 when the gate 25 is in the fully closed position. The locking arm 70 is rotatably mounted on a pin 71 that extends through a hollow boss 72, FIGURE 5, that is formed integrally with the associated extension 57. Movable with and forming a part of the locking arm 70 is an extension arm 73 which is provided with a key shaped opening 74 that is arranged to receive a key shaped end 75 of a locking pin 76, FIGURE 9, which is slidably mounted at one end in a wall 77 extending from the frame wall 20. At the other end the locking pin 76 is slidably mounted in a wall 78 of the extension 57. A sealing band 79 extends through an opening 80 in the key shaped end 75 of the locking pin 76 to prevent unauthorized operation of the locking mechanism. As shown in FIGURE 9 a handle 81 is secured by a rivet 82 to the locking pin 76. On rotation of the handle 81, the key shaped end 75 is rotated into registry with the key shaped opening 74 to permit withdrawal of the locking pin 76 from the extension arm 73.

Extending laterally from the locking arm 70 is a lug 83 for receiving a prying bar to effect rotation of the locking arm 70 to the unlocked position in the direction indicated by the arrow 84. A stop pin 85 on the wall 78 is engaged by the extension arm 73 to hold it and the locking arm in the open position.

What is claimed as new is:

1. A hopper discharge opening closure structure for use in a railroad car having an opening providing for the downward discharge of lading and comprising, in combination, a frame having side walls and end walls forming a discharge opening, a longitudinal way parallel to and secured to each of said sidewalls adjacent the lower portions thereof and extending toward each other along opposite sides of said opening a gate slidable along the upper surfaces of said ways underneath one of said end walls, rack teeth extending downwardly from the under side of said gate, a rack stationarily mounted below said gate having rack teeth extending upwardly, a pinion meshing with said rack teeth on said gate and on said rack, and means for rotating said pinion to move said gate between open and closed positions.

2. A hopper discharge opening closure structure for use in a railroad car having an opening providing for the downward discharge of lading and comprising, in combination, a frame having side walls and end walls forming a discharge opening, a longitudinal way parallel to and secured to each of said side walls adjacent the lower portions thereof and extending toward each other along opposite sides of said opening, a gate slidable along the upper surfaces of said ways underneath one of said end walls, rack teeth extending downwardly from the under side of said gate along about one half of its length beginning adjacent said one end wall when said gate is closed, a rack stationarily mounted below said gate parallel to its path of movement to open position and underlying said path, rack teeth extending upwardly from said rack, a pinion meshing with said rack teeth on said gate and on said rack, and means for rotating said pinion to move said gate between open and closed positions.

3. A hopper discharge opening closure structure for use in a railroad car having an opening providing for the downward discharge of lading and comprising, in combination, a frame having side walls and end walls forming a discharge opening, a longitudinal way parallel to and secured to each of said side walls adjacent the lower portions thereof and extending toward each other along opposite sides of said opening, a gate slidable along the upper surfaces of said ways underneath one of said end walls, rack teeth extending downwardly from the under side of said gate along the sides thereof, a pair of racks stationarily mounted below said sides of said gate having rack teeth extending upwardly, a pair of pinions in spaced apart relation each meshing with the teeth on one of said racks and the teeth on the gate thereabove, and a shaft mounting said pinions for rotating them to move said gate between open and closed positions.

4. A hopper discharge opening closure structure for use in a railroad car having an opening providing for the downward discharge of lading and comprising, in combination, a frame having side walls and end walls forming a discharge opening, a longitudinal way parallel to and secured to each of said side walls adjacent the lower portions thereof and extending toward each other along opposite sidese of said opening, a gate slidable along the upper surfaces of said ways underneath one of said end walls, rack teeth extending downwardly from the under side of said gate along the sides thereof for about one half its length beginning adjacent said one end wall when said gate is closed, a rack stationarily mounted below said sides of said gate parallel to its path of movement to open position in underlying relation thereto and offset from said gate in closed position, rack teeth extending upwardly from said racks, a shaft rotatably and translatorily mounted below said gate and above and transversely of said racks, and a pair of pinions non-rotatably mounted near the ends of said shaft each meshing with the teeth of one of said racks and the teeth on the gate thereabove whereby on rotation of said shaft said gate is moved translatorily twice as far as said shaft is moved likewise.

References Cited in the file of this patent

UNITED STATES PATENTS

| | | |
|---|---|---|
| 280,621 | Hetfield | July 3, 1883 |
| 769,957 | Pharis | Sept. 13, 1904 |
| 1,122,918 | Hart et al. | Dec. 29, 1914 |
| 1,347,375 | Huffman | July 20, 1920 |
| 1,484,764 | Dood | Feb. 26, 1924 |
| 1,659,065 | Weigand | Feb. 14, 1928 |
| 2,318,763 | Ditchfield | May 11, 1943 |
| 2,386,702 | McBride | Oct. 9, 1945 |
| 2,753,815 | Dorey | July 10, 1956 |
| 2,791,973 | Dorey | May 14, 1957 |
| 2,989,931 | Joy | June 27, 1961 |